N. W. McLEOD.
PNEUMATIC TIRE CASING.
APPLICATION FILED MAY 10, 1912.
1,055,774.
Patented Mar. 11, 1913.
2 SHEETS—SHEET 1.
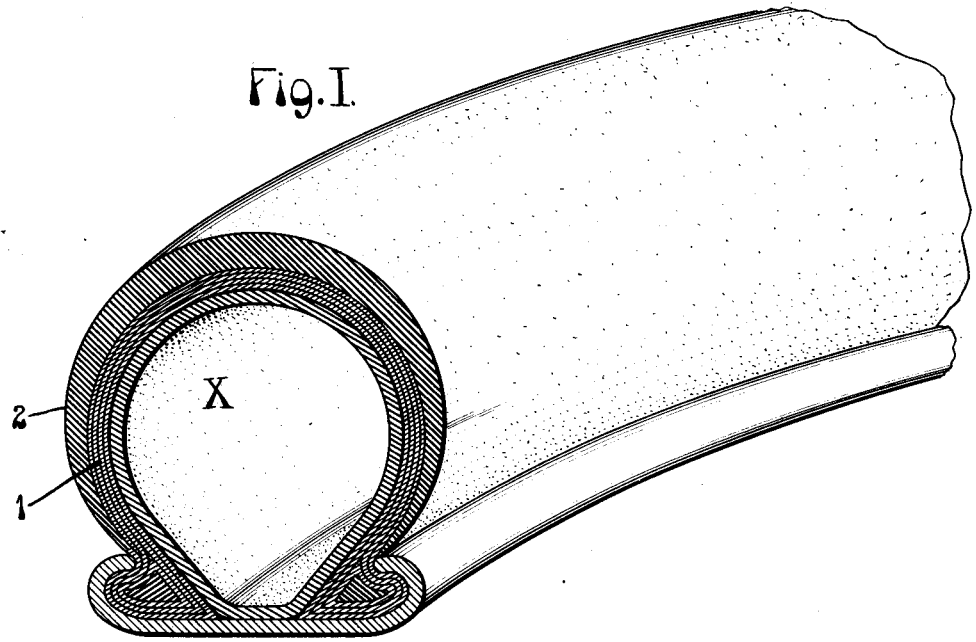
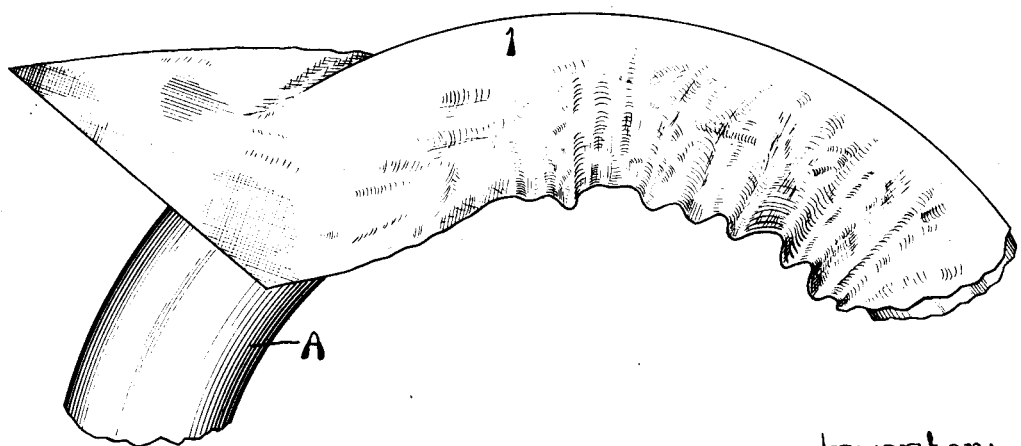
Attest
a.j. mcCauley
E. B. Finn
Inventor:
N.W. McLeod,
by Knight & Cook
Att'ys.

N. W. McLEOD.
PNEUMATIC TIRE CASING.
APPLICATION FILED MAY 10, 1912.
1,055,774.
Patented Mar. 11, 1913.
2 SHEETS—SHEET 2.
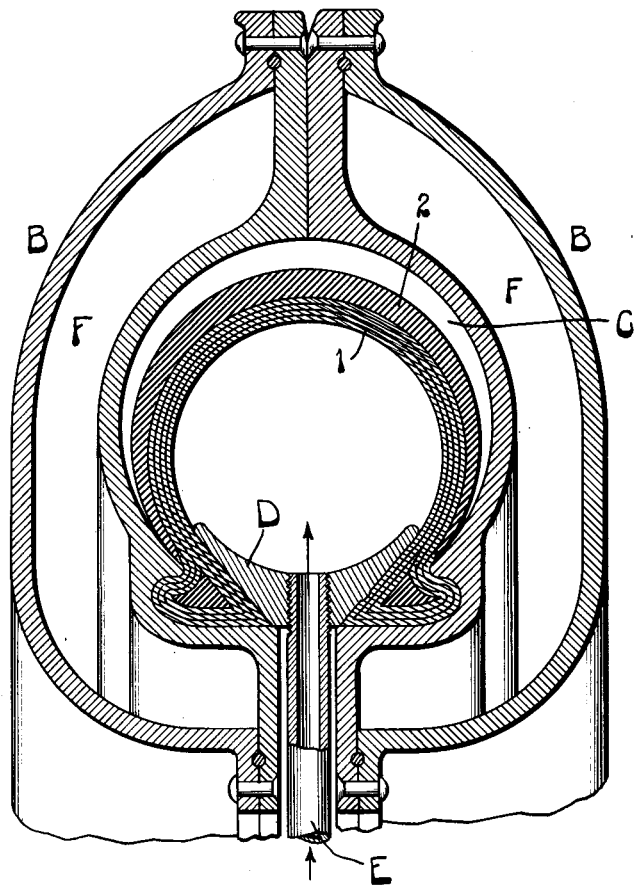
Fig. III.
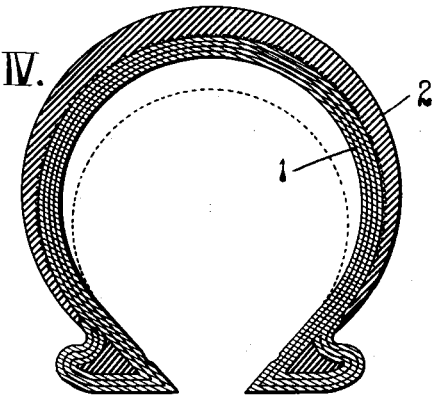
Fig. IV.
Attest
a. J. McCauley
E. B. Finn
Inventor:
N. W. McLeod,
by
Att'ys.

UNITED STATES PATENT OFFICE.

NELSON W. McLEOD, OF ST. LOUIS, MISSOURI, ASSIGNOR TO AMERICAN TIRE COMPANY, OF ST. LOUIS, MISSOURI, A CORPORATION.

PNEUMATIC-TIRE CASING.

1,055,774.      Specification of Letters Patent.      Patented Mar. 11, 1913.

Application filed May 10, 1912. Serial No. 696,292.

*To all whom it may concern:*

Be it known that I, NELSON W. MCLEOD, a citizen of the United States of America, and a resident of the city of St. Louis and State of Missouri, have invented certain new and useful Improvements in Pneumatic-Tire Casings, of which the following is a full, clear, and exact description, reference being had to the accompanying drawings, forming a part of this specification.

My invention relates to a pneumatic tire casing of the kind within which inflatable inner tubes are commonly utilized, and which are open at their inner circumferences for the insertion of the inner tubes thereinto.

Tire casings of the above description are composed of rubber as a cushioning element, and fabric as a reinforcing element, and inasmuch as the latter must be depended upon as a skeleton to furnish the necessary resistance to such stresses and strains as the tire casing may be subjected to when it is in service, it is highly essential that such fabric be present in the casing in such condition as to afford a uniformity of strength throughout the structure. It is furthermore highly essential that the fabric be in such condition as to prevent its being stretched by the inner tube pressure to avoid stretching of the rubber incident to stretching of the fabric. In the production of such pneumatic tire casings, the fabric used is rubberized and commonly cut into strips, and these strips are stretched circumferentially of a suitable annular mandrel, whereby both the warp and woof of the fabric are placed under tension only at the periphery of the casing structure. The fabric strips are of such widths as will admit of their extending laterally from the periphery of the casing for incorporation into the sides of the casing structure, and it is obvious that the lateral portions of the strips must be condensed into the sides of the casing, owing to decrease in diameter of the casing from its outer circumference toward its inner circumference. It will be evident that such condensation results in compacting of the fabric threads at the sides of the casing structure, and this compacting results only in smoothing down the fabric without placing the fabric threads under a tension, commensurate with the tension of the threads at the periphery of the casing structure, and, as a consequence, the fabric threads at the sides of the structure cannot uniformly take care of the stresses and strains they are subjected to in the service of a pneumatic tire. Moreover, the portions of the threads in the condensed fabric at the sides of the casing structure are in a condition to yield in response to inner tube pressure, when a tire is in service, with resultant stretching of the rubber vulcanized thereto, thereby affording opportunity for such distortion of the rubber as to render the rubber much more susceptible to injury than it would be if it were in an unstretched condition during service.

My present invention relates to a tire casing so made as to eliminate the faults I have set forth, and in which the component parts of the tire are so adjusted and set relative to each other as to provide for their occupying, originally, the same positions they will occupy when the tire casing is subjected to inner tube pressure and in service upon a vehicle wheel.

Figure I is a view, partly in perspective and partly in cross section of a fragment of a pneumatic tire including a casing made in accordance with my invention. Fig. II is a view illustrative of the manner of laying up the fabric skeleton of the tire casing in the process of making it. Fig. III is a cross section through an apparatus in which the raw structure of my tire casing may be treated after it has been formed for the purpose of rendering the structure of the casing such as is contemplated by my invention. Fig. IV is a cross section of my tire in its completed condition.

In the drawings: 1 designates layers of fabric which constitute the skeleton of my tire, and 2 is an outer layer of rubber vulcanized to said skeleton at its outer circumference and sides.

In building up a raw tire casing comprising the elements 1 and 2, the fabric layers 1, produced from strips of rubberized fabric, preferably cut diagonally of the mesh of the fabric, are stretched circumferentially around a suitable mandrel, such as that illustrated at A, Fig. II; the fabric being thereby placed under tension midway of its width. When this is done, the lateral portions of the fabric, which are to be incorporated in the sides of the tire casing, are in a loose condition, as illustrated in Fig.

II, and for the proper formation of a casing, must be condensed to conform to the shape of the annular mandrel, which decreases in diameter from its outer circumference toward its inner circumference. The condensation of the fabric is preferably accomplished by the use of suitable milling tools, or other implements, by which the loose fabric in the sides of the raw casing is compacted to an extent that will render the structure apparently smooth at its sides, but which results in a distortion of the fabric, and an un-uniform positioning of the portions of the fabric threads which lie in the sides of the casing structure. Any desired number of strips of fabric may be thus laid up around the mandrel A by first stretching the strips circumferentially of the mandrel, and then condensing the lateral portions of the strips, as explained, and thereafter raw rubber which is to produce the layer 2 of the tire casing is applied to the fabric skeleton previous to the usual vulcanization of such casing.

It will be evident that the tire casing may have its edges formed in any well known manner to permit of the completed casing being attached to the rim of a vehicle wheel that is to receive it, the casing illustrated in the drawings having edges of the clencher type.

A tire casing laid up in accordance with the foregoing description and then vulcanized corresponds to the tire casings as heretofore very commonly made, and no invention *per se*, broadly considered, is herein claimed for such a casing.

When a raw tire casing has been built up in the manner explained, I subject it to a treatment that changes the structure of the skeleton of the casing, and it is upon this change of structure that my present invention is based, the change being preferably accomplished by the use of the apparatus illustrated in Fig. III of the drawing. The apparatus comprises a tire vulcanizer, including mold sections B, separable from each other and furnishing a mold cavity C that is of greater transverse diameter than the diameter of the raw casing structure, laid up and formed as hereinbefore described, which is introduced into said cavity to be treated therein. The apparatus also includes means such as an abutment D, for clamping the edges of the casing, and a pipe E by which fluid, for example, steam or air, may be introduced into the casing.

When fluid under pressure is introduced into the raw casing, as stated, it acts to stretch the fabric skeleton of such structure, with the result of forcing the casing outwardly to the wall of the mold cavity C, whereby the casing is enlarged from the size indicated in full lines Fig. III and dotted lines Fig. IV to the size shown in full lines Fig. IV. The fabric being so stretched, its threads are placed under uniform tension to a degree that will cause them to be adjusted in the raw rubber from their previously distorted positions to the positions they will tend to assume when the tire casing is in service, the degree of tensioning of the fabric threads, necessary to produce the desired result, being such as to stretch the threads to, approximately, the limit of their elasticity. It should be noted at this point that to prevent permeation of fluid into the casing structure when it is used in the manner described, a suitable medium, such for instance, as a layer of rubber, should be applied to the inner face of the raw casing.

Inasmuch as it is intended that the finished casing made in accordance with my invention shall be susceptible of withstanding the degree of pressure exerted thereagainst by an inner inflatable tube, as shown at X, in Fig. I of the drawings, the degree of pressure exerted by the fluid introduced into the raw tire casing to stretch the fabric skeleton is preferably equal to or greater than the degree of internal pressure the finished casing structure will be subjected to when it is in service as a component of a pneumatic tire. When the raw casing structure is treated according to my invention, the fabric threads are, as previously stated, adjusted and placed under uniform tension to a degree sufficient to stretch the fabric threads to, approximately, the limit of their elasticity at a time when the threads are free to yield in the raw rubber. Thereafter, the casing structure is vulcanized while the threads are held in their adjusted positions under the degree of tension mentioned, with the result of their subsequently maintaining such positions when the finished tire is made and when it is subsequently in service, hence the casing is constantly in a normal condition in service and not as susceptible to injuries as are similar casings in which the fabric skeletons are not originally stretched as herein contemplated.

The vulcanization of my tire casing is preferably accomplished by utilizing steam as the fluid for stretching the raw casing structure, or some other fluid vulcanizing agent, and also by introducing steam, or another fluid vulcanizing agent into the chambers F of the apparatus shown in Fig. III.

I do not herein make any claim to the method of making pneumatic tire casings, nor to the apparatus for molding such casings, both herein described, the former being made the subject matter of claims in an application for patent filed by me November 13, 1911, Serial Number 660,027; and the latter being made the subject matter of claims in an application for patent filed by Mark A. Dees and myself April 5, 1912, Serial Number 688,607.

I claim:—

A pneumatic tire casing having separated edges and comprising a fabric body and a coating of vulcanized rubber; the said fabric body having its threads uniformly tensioned in the casing structure to, approximately, the limit of their elasticity and substantially held at such degree of tension by the vulcanized rubber.

NELSON W. McLEOD.

In the presence of—
E. B. LINN,
A. J. McCAULEY.